E. B. WASTIE.
ADVERTISING DISPLAY DEVICE.
APPLICATION FILED NOV. 24, 1916.

1,269,024.

Patented June 11, 1918.
2 SHEETS—SHEET 1.

WITNESSES:

INVENTOR.
Edward B. Wastie
BY
ATTORNEYS.

UNITED STATES PATENT OFFICE.

EDWARD B. WASTIE, OF BILLINGS, MONTANA.

ADVERTISING-DISPLAY DEVICE.

1,269,024.　　　　　Specification of Letters Patent.　Patented June 11, 1918.

Application filed November 24, 1916.　Serial No. 133,121.

*To all whom it may concern:*

Be it known that I, EDWARD B. WASTIE, a citizen of the United States, residing in Billings, in the county of Yellowstone and State of Montana, have invented a new and useful Improvement in Advertising-Display Devices, of which the following is a specification.

This invention relates in general to advertising display devices and has more particular reference to devices of this character provided for the attractive display of building materials. The invention will hereinafter be described in connection with a device particularly adapted for the display of house paints, but it will be manifest as the invention is better understood that it has a wider and more general application, being capable with little or no change for use in displaying the visual effect of various forms of brick, house tile, stucco, and, of course, for other purposes.

A principal object of the present invention is the provision of a device which will permit of an accurate estimate of the visual effect of combinations of desired colors when applied to a house of a particular character and which will permit of comparisons of color-combinations through the utilization of a single device quickly altered to display first one combination and then another.

A further object of the invention is the provision of such a device constructed and arranged for ready use by the sellers of the paint or other material, and also adapted for use by architects in determining with their clients the outward effect of the house designed when decorated.

An additional and highly important object is the provision of a device possessing these and other advantages which may be constructed at a price sufficiently low to permit its use in considerable numbers by the retail dealers and to permit the manufacturer to furnish them free or at a nominal cost to such dealers.

Numerous other objects and advantages of the invention will be apparent as it is better understood from the following description when considered in connection with the accompanying drawings illustrating a preferred embodiment thereof.

Figure 1:
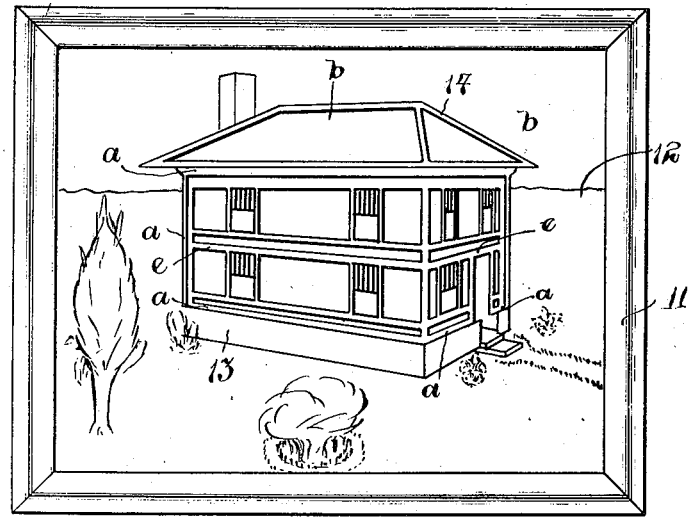
Figure 1 is a front elevation of an advertising display of paints as applicable to a house of two-stories and embodying my present invention.
Figure 5:
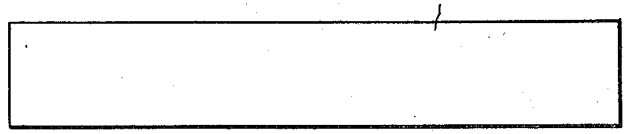
Fig. 5 is a plan view of a roof color card.
Figure 6:
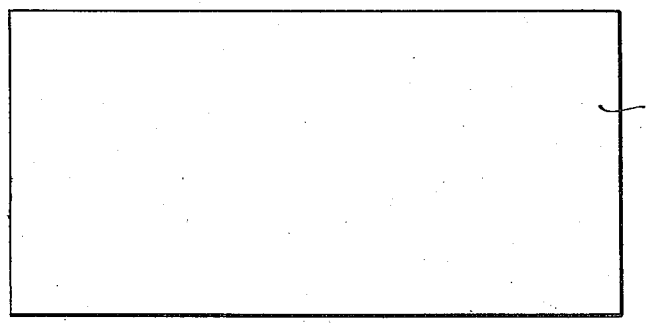
Fig. 6 is a plan view of a wall color card.
Figure 7:
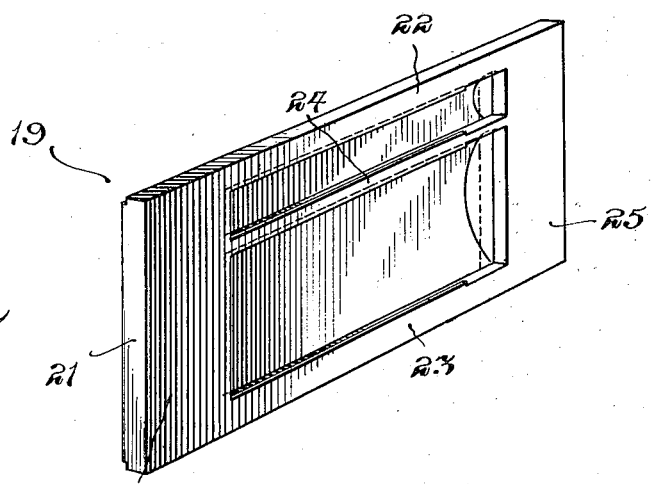
Fig. 7 is a view of the holder for the stencils and cards, parts being shown in dotted lines.

For the purpose of illustrating my invention I have shown on the drawings an advertising display comprising a frame 11 which is provided merely to enhance the effect and to give to the entire device the effect of a painted landscape. Within this frame is a plate 12 on which is painted the pictorial representation of a landscape as shown. Painted also upon this plate is a foundation 13 and the trim 14 of the roof. The part of a house occupied by the body wall is set off to be represented in colors which may be changed at will. In the present instance, this part is set off by cutting away the portion of the house indicated in Fig. 1 on the lines *a*. The roof body parts are also set off by cutting away the parts defined by the trim, these parts are indicated at *b*. By this construction the roof trim is shown as a stencil integral with the plate itself. And it is my intention to place behind this stencil a color card 15 to display a desired roof color. The trim of the body of the house is preferably provided by furnishing a separate stencil 16 which is indicated in Fig. 5, this stencil being constructed so that the desired windows and doors are connected through trim parts or directly with the horizontal trim parts, as will be seen when viewing the figure just indicated. It is intended to position this stencil directly behind the opening defined by the lines *a* and to position behind it a color card 17 for displaying the desired color of wall body. It is of course to be understood that the stencil 16 and the two color cards 17 and 15 may be interchanged with other like members and may be used with other plates so that the plate may be considered interchangeable also.

Figure 2:
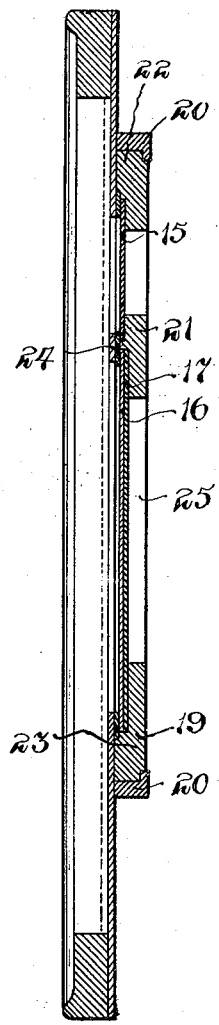
Fig. 2 is a similar view showing the two-story house replaced by a one-story bungalow.
Figure 3:
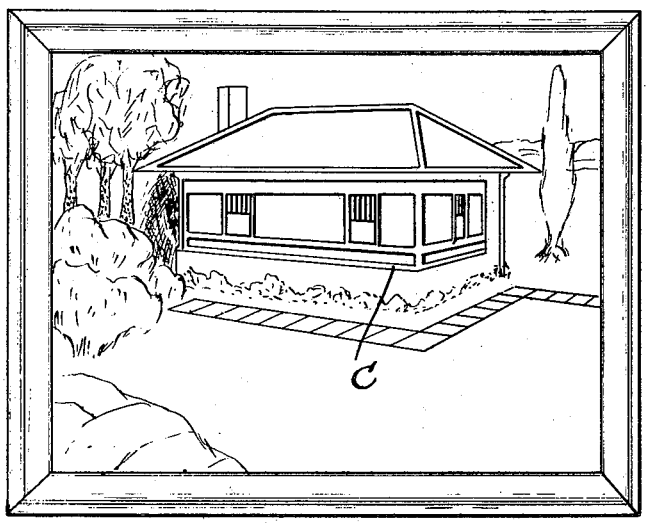
Fig. 3 is a sectional view taken vertically of Fig. 1.
Figure 4:
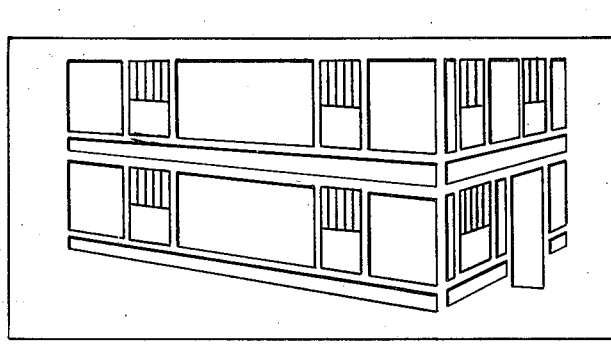
Fig. 4 is a detailed view of a stencil employed in Figs. 1 and 2.

It is particularly desirable in a device of this character that the house be shown in full perspective so that more than one wall and more than one roof part can be seen. To accomplish this the stencils and apertures through which they are viewed or delineate are cut to perspective. In order to adapt these color cards, plates, and particularly the stencils to use with different plates, color cards and stencils, it is desirable that there be a common straight line reference across the plate horizontally and vertically. There is no difficulty in providing the vertical reference and the horizontal reference is provided by arranging the lower edge of the roof on the horizon line, so that the top of the end wall and the top of the side wall in view form a continuous single line. One particular virtue of this arrangement is that the same stencils may be used in plates showing houses of different heights and of different numbers of floors. To illustrate this we have shown on the drawings in Fig. 2 a plate for a one-story bungalow and designed to use the cards and stencils usable with the plate shown in Fig. 1, the lower edge of the opening c showing the wall in this plate will coincide with the horizontal run of trim indicated at e on the stencil in Fig. 1, the rest of the stencil being hidden by the lower part of the plate.

Two stencils are thus provided, one for the roof trim and one for the house trim, the roof trim in the present instance being a part of the plate as it is always of a substantially uniform and unobtrusive dark color. The stencils are thus separate from each other, which is desirable but not necessary to the attainment of all of the advantages of the invention.

It is desirable of course that the color cards added to the plate to complete the picture be easily and quickly arranged and substituted for others. To this end I provide a common holder for them which consists of a carrier 19 sildable, in the present instance, in guides 20. The carrier consists of a rack or body plate 21 having a top rail 22 and a bottom rail 23, and also a central rib 24, together with end members 25. The space defined between the top rail 22 and the rib 24 is appropriate to receive a color card 15, and the space defined between the rib 24 and the bottom rail 23 is appropriate to receive a color card 17 and a stencil 16 in front of it.

It will be readily manifest that this arrangement permits of the easy removal of the carrier and a quick change of color combinations. As is desirable in a device of this character this change can be made with sufficient rapidity to permit one set of colors to be shown before the visual effect of the preceding set is forgotten.

A relatively small number of plates combined with a relatively small number of stencils and a considerable quantity of color cards can be utilized to meet the paint requirements of a large number of prospective purchasers. The various parts may be cheaply manufactured and at a price which should not prevent the manufacturer from furnishing them to the retailer free or at a nominal price.

Where it is desired to advertise brick, stucco or the like, reduced reproductions may be shown on the color cards in place of paint.

It is thought that the invention and many of its attendant advantages will be understood from the foregoing without further description and it will be apparent that various changes can be made in the form, construction and arrangement of the parts without departing from the spirit and scope of the invention or sacrificing any of its material advantages, the form hereinbefore described being merely a preferred embodiment thereof.

I claim:

1. An advertising display for wall covering materials and the like, comprising a plate carrying a representation of surrounding objects not to be covered with said materials, a stencil coated with one of said materials and representing a part of the article or wall to be covered, and a plate behind said stencil and covered with another of said materials to represent the body of said wall, said stencil and said last mentioned plate being each individually replaceable by other like members.

2. An advertising display for wall covering, paints, and other materials, comprising a plate giving a view of the landscape surrounding a building and including the parts of said building not to be covered or painted and having the portions to be covered or painted set off from said landscape, a stencil cut to represent the trim or woodwork of said building, and a solid color background, said stencil and said background being positioned in the set-off portions of said plate with the stencil in front of the background to represent all of the parts of said building to receive paint or other covering.

3. An advertising display for paints and other materials, comprising a plate having a part set off to be occupied by a representation of a building in colors, a holder for said plate, a stencil cut and decorated to represent the trim of said building, a background of solid color to represent the body of the walls, and common holding means for sustaining said stencil and background in said set-off location in said plate.

4. A display for advertising paint and other materials, comprising a plate carrying a pictorial representation of a landscape, a stencil for representing the trim of a house, and a background for representing the body walls of a house, and common holding means for said stencil and background and for sustaining them within the landscape depicted on said plate.

5. An advertising display for paints and other materials, comprising a plate carrying a pictorial representation of a landscape and having a large perforation therethrough, a stencil adapted to be disposed behind said perforation and colored to represent the trim of a house, and a background behind said stencil and visible therethrough and colored to represent the color of the body of the walls of the house.

6. An advertising display comprising a plate carrying a pictorial representation of a landscape and having parts cut away to be replaced to complete a pictorial representation of a house in said landscape, a stencil positioned behind said cut away portion or portions to represent the trim of said house, and a background behind said stencil to represent the body of the walls of said house, the parts being cut and arranged to show all of the walls visible in perspective with the stencil and background.

7. An advertising display comprising a plate carrying a picture of a house with the body set off, a stencil adapted to be disposed in said set-off part of said plate and cut to show a plurality of trim parts in perspective from a horizon line located along an edge of said stencil when in place, and a background behind said stencil for depicting the body of the walls carrying said trim.

8. An advertising display comprising separate stencils, one for depicting roof trim and the other for depicting wall trim of a house, and color backgrounds adapted to be disposed behind said stencils to depict the body parts of said roof and wall to complete a representation of a house in color.

9. An advertising display comprising separate stencils, one for depicting roof trim and the other for depicting wall trim of a house, and color backgrounds adapted to be disposed behind said stencils to depict the body parts of said roof and wall to complete a representation of a house in color, said stencils showing the house in perspective with the horizon line adjacent their meeting line.

Signed in the presence of two subscribing witnesses.

EDWARD B. WASTIE.

Witnesses:
THOMAS J. O'BRIEN,
M. E. BARRY.